United States Patent [19]

Ito et al.

[11] Patent Number: 5,125,047
[45] Date of Patent: Jun. 23, 1992

[54] ORIGINAL-READING DEVICE WITH A MOVABLE READING UNIT

[75] Inventors: Yoshio Ito, Tokyo; Masaaki Nishikawa, Yokohama; Junichi Sata, Kawasaki, all of Japan

[73] Assignee: Canon Kabushiki Kaisha, Tokyo, Japan

[21] Appl. No.: 598,424

[22] Filed: Oct. 16, 1990

[30] Foreign Application Priority Data

Oct. 20, 1989 [JP] Japan .................. 1-274641

[51] Int. Cl.⁵ .............................................. G06K 9/20
[52] U.S. Cl. ....................................... 382/65; 382/67; 358/461; 358/496; 358/498; 355/68
[58] Field of Search ............... 382/53, 65, 67, 68; 358/461, 464, 496, 498, 163; 235/455, 470; 355/68

[56] References Cited

U.S. PATENT DOCUMENTS

| | | | |
|---|---|---|---|
| 4,578,711 | 3/1986 | White | 358/464 |
| 4,602,293 | 7/1986 | Sekine | 358/461 |
| 4,760,464 | 7/1988 | Sakano | 382/53 |
| 4,806,780 | 2/1989 | Yamamoto et al. | 358/461 |
| 4,823,195 | 4/1989 | Ito | 358/285 |
| 4,907,097 | 3/1990 | Sobue | 358/461 |
| 4,961,117 | 10/1990 | Rumley | 358/461 |
| 4,970,606 | 11/1990 | Shima | 358/496 |
| 4,984,285 | 1/1991 | Kano et al. | 382/65 |
| 4,989,100 | 1/1991 | Ishima | 358/461 |

*Primary Examiner*—Leo H. Boudreau
*Assistant Examiner*—David Fox
*Attorney, Agent, or Firm*—Fitzpatrick, Cella, Harper & Scinto

[57] ABSTRACT

An original-reading device includes a light source for irradiating an original disposed at a reading position, a photoelectric conversion device for converting light reflected from the original into an image signal, a reading unit supporting the light source and the photoelectric conversion device, a feeder for feeding the original to the reading position, a reference member provided at a position different from the reading position, for correcting an image signal from the original, and means for moving the reading unit between a position for reading the reference member and the reading position.

40 Claims, 4 Drawing Sheets

ORIGINAL-READING DEVICE WITH A MOVABLE READING UNIT

BACKGROUND OF THE INVENTION

1. Field of the Invention

This invention relates to an original-reading device which illuminates an original and reads image light from the orginal with a reading sensor, such as a photoelectric conversion device or the like.

2. Description of the Related Art

A device which iluminates a sheet-like original with an illuminating light source, images light reflected from the surface of the original onto a reading sensor device using an optical system, and performs photoelectric conversion of the image to obtain signal information has been widely used in devices, such as a facsimile, a copier, an image scanner or the like. In this kind of apparatus, a cylindrical lens has generally been used as an imaging lens, which results in a small apparatus. Recently, for the purpose of providing a small apparatus, a contact sensor, which incorporates and confines a rod array lens together with an illuminating light source and a unit-magnification reading sensor as one body, has been produced and rapidly propagated.

Figure 4:
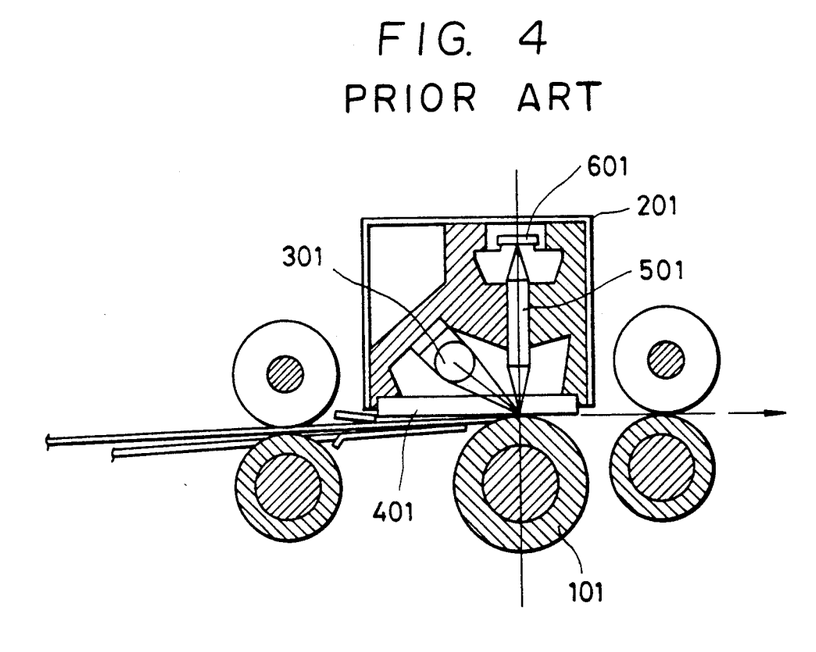
FIG. 4 is a diagram showing a conventional reading device.

FIG. 4 shows a cross-sectional view of this kind of reading device as a conventional example. A contact sensor 201 of the device includes a light source 301, an imaging lens 501 and a photosensor 601. A transparent glass body 401 is provided at the side of an optical path used for a reading operation, and a surface of the glass body 401 is made an imaging surface. An original to be read is made to contact the imaging surface, and information is read while feeding the back of the original with a rotating roller 101. This apparatus can be more or less satisfactorily used for reading information, such as characters or the like, to obtain binary-coded signal information. However, recent demand from the market has become more severe, and a scanner capable of reading information in an original having gradation, such as a photograph or the like, with a high picture quality has been demanded. In order to respond to such a demand, a method is currently adopted in which the above-described rotating roller is made white, the white background on the surface of the rotating roller is read before reading information from an original to provide a reference for white balance correction, an original having an image with gradation is then read, and the information from the original is corrected in accordance with the correction. Although this method is good for inputting information having lower gradation, a stain in the white reference has become a big problem for high picture quality (high gradation). That is, the outer circumferential surface of the roller rotates in contact with the surface of the glass when an original is not present. The surface of the roller can become stained or may produce a worn-out powder while repeating such rotation, causing a stain on the imaging surface of the glass. Although it is possible to periodically clean the surface of the glass, the surface of the roller can not always be restored to the white reference level present at the initial stage even if it has been cleaned. Hence, the above-described method has the disadvantage that a reading device for reproducing high picture quality cannot be provided.

Several countermeasures have been considered for solving the above-described problem in the prior art. They are, for example, selection of an abrasion-resistive material which does not produce the phenomenon of abrasion of the rotating roller even if there is abrasive slippage with the surface of the glass, improvement in materials, such as a reduction of the coefficient of friction ($\mu$) between the rotating roller and the surface of the glass causing abrasion, a mechanical method, such as separating the surface of the roller from the surface of the glass when an original to be read is not present so that the phenomenon of friction is not produced at all, and the like. One must say, however, that a complete solution directed to the materials is very difficult to achieve. The separation of the roller results in a complicated and expensive configuration. Hence, none of the above-described approaches are effective means for solving the problems. Even if one of the above-described methods is adopted and abrasion of the rotating roller is thereby reduced, there is the problem that the original to be read itself introduces dust from the surroundings causing stain, which stains the surface of the roller with the lapse of time.

SUMMARY OF THE INVENTION

It is an object of the present invention to provide an original-reading device capable of faithfully reading an original irrespective of a stain in the feed means for feeding the original at a position for reading the original.

It is another object of the present invention to provide an original-reading device whose reference member for reading an original is protected from stain.

It is still another object of the present invention to provide an original-reading device in which the position of a reading unit changes according to the rotation of a rotating member contacting the reading unit.

These and other objects of the present invention will become more apparent from the following description of the preferred embodiments.

According to a firsst aspect of the present invention, an original reading device includes a light source for irradiating an original with light, and a photoelectric conversion device for converting light reflected from the original into an image signal. A reading unit is provided for supporting the light source and the photoelectric device. Feeding structure is provided for feeding the original to a reading position, and image signal-correcting reference member is provided at a position different from the reading position. Structure is provided for moving the reading unit between a position for reading the reference member and a position for reading the original.

According to another aspect of the present invention, an origianl reading device includes a light source for irradiating an original disposed at a reading position, and a photoelectric conversion device for converting light reflected from the original into an image signal. A reading unit supports the light source and the photoelectric conversion device, and the reading unit is rotatably movable around a rotation shaft. A reference member is provided at a position different fromthe reading position, for correcting the image signal ofthe original. Structure is provided for rotatably moving the reading unit between a position for reading the reference member and the reading position.

According to yet a further aspect of the present invention, an original reading device comprises a light source for irradiating an original disposed at a reading position, and a photoelectric conversion device for converting light relfected for the original into an image signal. A reading unit supports the light source and the photoelectric conversion device, and a rotating member is disposed facing the reading unti and has an outer circumferential surface contacting the reading unit. A reference member is provided at a position different from the reading position, for correcting an image signal from the original. Structure is provided for moving the reading unit between a position for reading the reference member and the reading position in accordance with a rotation of the rotating member.

According to still a further aspect of the present invention, in a device for reading an image from an original, apparatus for readjng a reference member to obtain an image correction reference signal includes a reading unit having a photoelectreic conversion device for reading original and the reference member. Structure is provided for moving the reading unit between a first position where the conversion device reads the original, and a second position where the conversion device reads the reference member.

DETAILED DESCRIPTION OF THE PREFERRED EMBODIMENTS

Embodiments of the present invention will now be explained by reference to the drawings.

Figure 1:
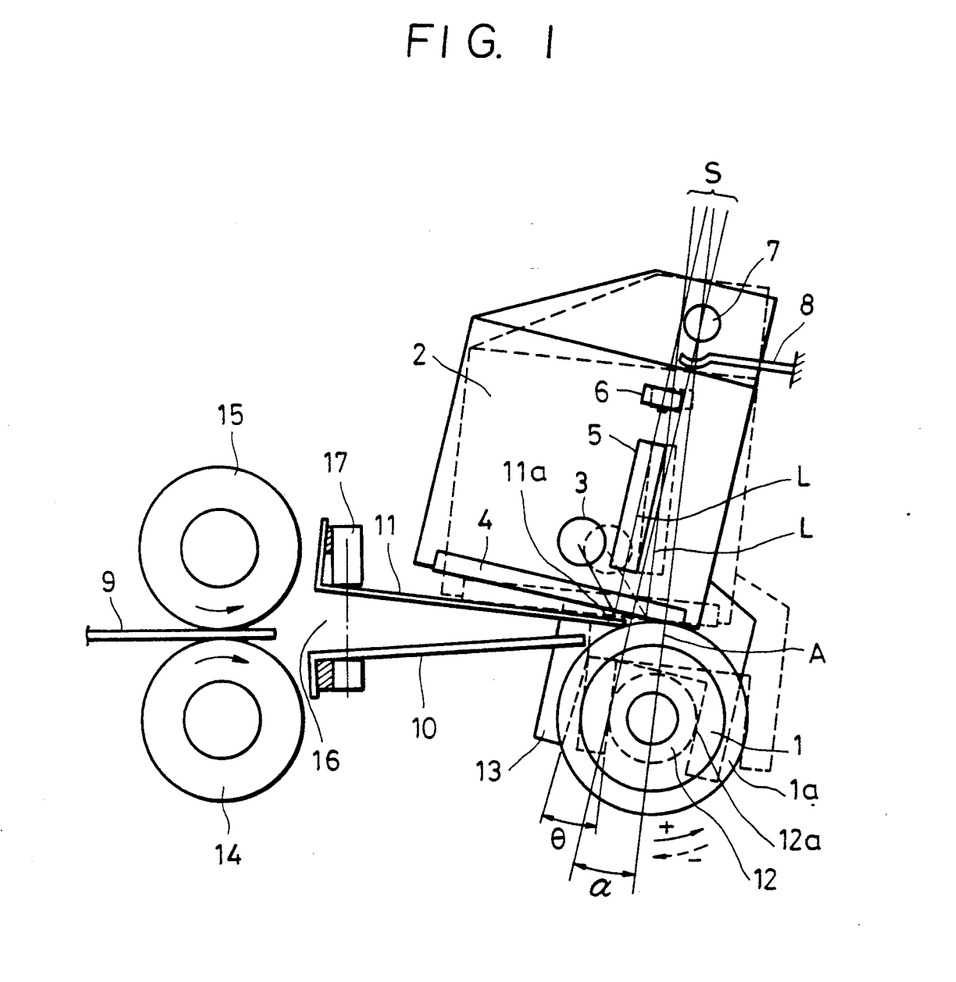
FIG. 1 is a cross-sectional view of an original-reading device according to an embodiment of the present invention.

FIG. 1 is a cross-sectional view of an original-reading device according to an embodiment of the present invention.

In FIG. 1, there is shown a feed roller 1 for feeding an original. A contact sensor 2, serving as an original-reading unit, incorporates an illuminating light source 3, transparent glass 4, an rod array lens 5 composed of short-focus imaging elements, and a unit-magnification reading sensor 6, all as one body.

The contact sensor 2 is swingable making a rotation shaft 7 a center of rotation, and is pressed against the feed roller 1 by a spring 8, serving as a pressing member. The feed roller 1 having an elastic-rubber-type material 1a around its outer circumference feeds an original 9 without producing slippage. The outer circumferential surface of the feed roller 1 is made white in order to make portions other than the original white during a reading operation. There are also shown a lowre original-guiding member 10 and an upper original-guiding plate 11. A reference member 11a provided with a white-background coating is provided on the upper surface of the upper original-guiding member all on the side of the contact sensor 2.

The feed roller 1 is rotatably supported within a bearing 12 mounted on a frame (not shown). All other members except the swingable contact sensor 2 are fixed to the frame. In order to make the contact sensor 2 swingable only within a fixed range $\beta$ indicated by solid lines and broken lines, an idle range $\theta$ corresponding to the amount of a swinging angle is provided for a regulating plate 13 fixedly mounted on the outer box of the contact sensor 2 so as to make an outer circumference 12a of the bearing 12 for the feed roller 1 a stop position.

A rotating driving force is transmitted from a driving motor (not shown) to the feed roller 1. If the feed roller 1 is rotated in the counterclockwise direction in FIG. 1, the contact sensor 2 swings to the position shown by the solid lines, and stops when the regulating plate 13 reaches the outer circumfernece 12a of the bearing 12. At this position, a reading optical axis L of the contact sensor 2 is set so that a white-background reference (such as member 11a) can be read. If the feed roller 1 is rotated in the clockwise direction, the contact sensor 2 swings and stops at the position shown by the broken lines. This position is a position for reading the original 9.

The above-described swinging movement, which is an operation for reading the white-background reference and information in the orginal, is performed due to a frictional force expressed by the product of the coefficient of friction $\mu$ (between the transparent glass 4 contacting the feed roller 1 with pressure F) and the pressure F, without providing another motor or the like.

The operation of the device will now be explained.

Positioning the reading surace of the original 9 up, conveyance of the original 9 within a conveying path between the upper and lower guiding members 10, 11 by a pair of conveying rollers 14 and 15 is started. During this operation, the feed roller 1 is rotated in the counterclockwise direction in FIG. 1, and the contact sensor 2 is held at the position of the solid lines. If it is assumed that the direction of rotation of the motor at this time is, for example, positive (+), the coveying operation by the positive rotation is stopped when the front end of the original 9 has reached the point of a wedge region formed by the circumferential surface of the feeding roller 1 and the lower surface of the transparent glass 4, and some loop has been formed in the original. The stop operation may be performed after the lapse of a predetermined time (number of pulses) after receiving a signal provided by a sensor 17 for detecting the front-end-line of the original within the conveying path. This is a means which is, in general, widely used.

Subsequently, the contact sensor 2 performs a reading operation at this position. That is, the light source 3 illuminates the white-background reference, e.g. 11a, serving as a reference member, and reflected light obtained is imaged onto the photoelectric conversion device 6 via the lens 5. An electrical signal output from the photoelectric conversion device 6 is stored in a memory as a reference signal for the white background. Preparation for the correction of picture quality is thus completed. The motor is then rotated in the reverse direction (−). That is, the feed roller 1 starts to rotate in the clockwise direction, the contact sensor 2 thereby starts to move toward the position shown by the broken lines, and the original 9 is simultaneously fed toward the reading position. When the contact sensor 2 has reached the position shown by the broken lines, image information input to the contact sensor 2 is started.

The moment when the contact sensor 2 reaches the original-reading position can be detected by measuring the amount of rotation of the feed roller 1 or the time from starting rotation of the feed roller 1. In the present device, when the contact sensor 2 reaches the reading position, the regulating plate 13 contacts the outer circumference 12a of the bearing 12 to regulate the movement of the contact sensor 2. Hence, the reading position is invariable even if the feed roller 1 continues to rotate.

The original 9 continues to be read and fed due to friction produced between the original 9 and the feed roller 1, and the surface of the original 9 is in a sliding state relative to the surface of the glass of the contact sensor 2. Since the coefficient of friction between these surfaces is as low as 0.2-0.3, a stable image reading operation is continued until the original 9 passes without slipping relative to the feed roller 1. When a reading operation for the rear end of the original 9 has been completed and the original 9 is discharged from the feed roller 1, the rotation of the motor is stopped.

Thus, the original 9 is read by the contact sensor 2, and an image signal of the original 9 is output. The output image signal of the original 9 is compared with the above-described reference signal stored in the memory, and is corrected into a signal which exactly represents the state of the density of the original 9.

As described above, since the white-background reference 11a is provided separately from the feed roller 1, the white-background reference is hardly stained. Accoringly, it is possible to detect an exact white level, and to faithfully read even an image having high gradation.

By shifting the center of rotation for swinging the contact sensor 2 by a predetermined distance S relative to the reading optical axis of the contact sensor 2, as shown in FIG. 1, the reading line can be set at a position deviated from the contact line (the contact point in the cross-sectional view shown in FIG. 1) at the contact portion between the transparent glass 4 and the feed roller 1 in the position of reading the original 9. It becomes thereby posible to protect the glass surface on the original-reading optical axis from satin even if stain is produced on the glass surface at the contact portion between the transparent glass 4 and the feed roller 1 caused by slippage at the contact portion when the original 9 is not present, or the introduction of dust or the like while feeding the original 9. The contact range on the transparent glass 4 of the rolling movement of the contact line between the transparent glass 4 and the feed roller 1 while frictionally swinging the contact sensor 2 to the position for reading the white-background reference (the position shown by the solid lines) exists only in the range of the paper-discharging side to the right of the contact line A between the transparent glass 4 and the feed roller 1 while reading the original 9. Accordingly, it is also possible to protect the glass surface from stain while reading the original 9.

As can be fully understood from the foregoing explanation, even if dust or the like adhering to the original 9 is introduced from the outside, the contact sensor 2 can be moved to a position out of the conveying path so that introduction of dust is prevented. Accordingly, the reference member can be provided at this position, and the surface of the reference member can be securely protected from stain. Furthermore, by designing the guide plate as a thin leaf-spring material, a gap due to an error in the production of the member is not produced and it presses against the surface of the transparent glass with only a small pressure. Thus, it is possible to prevent penetration of dust and to improve reliability in the reading reference.

Although, in the above-described embodiment, the white-background reference member is provided by applying a white coating on the upper surface of the upper original-guiding plate 11, a white seal or sticker may be adhered or applied on the upper surface of the guiding plate 11. The essential point is that the upper surface of the guiding plate is at least partially white.

Next, another embodiment of the present invention will be explained.

Figure 2:
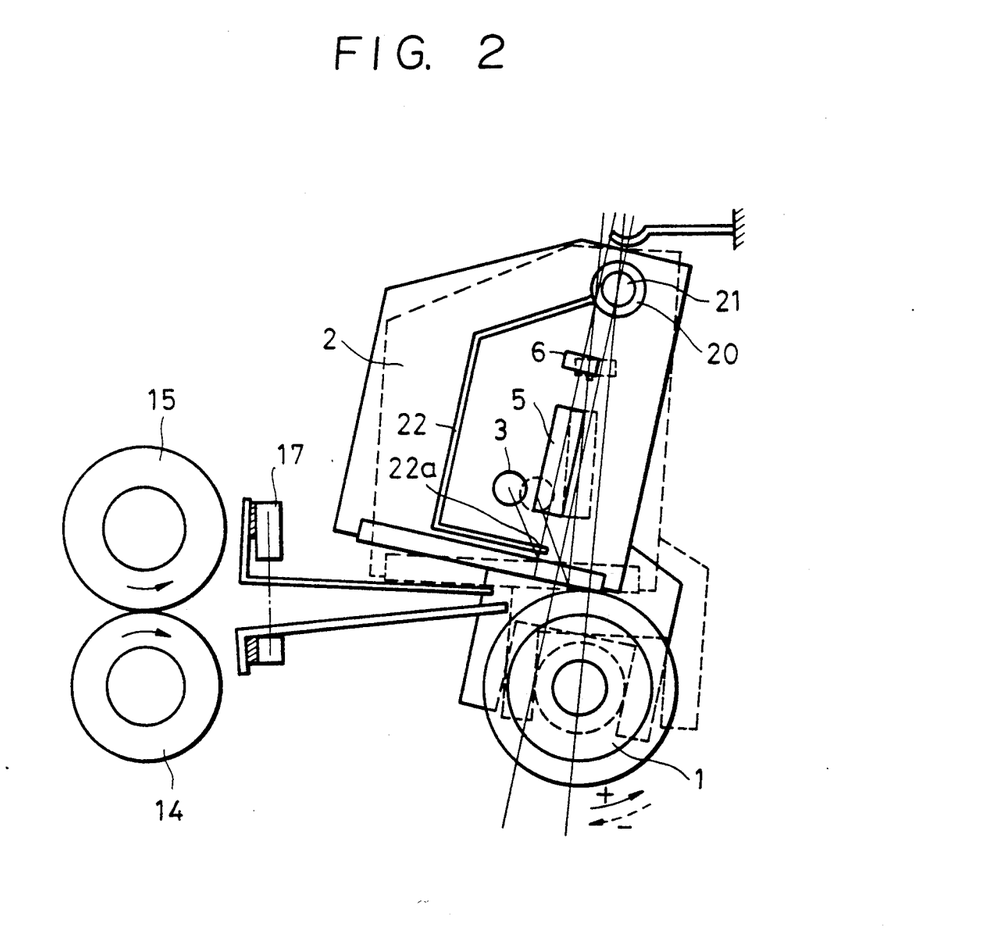
FIG. 2 is a cross-sectional view of an original-reading device according to another embodiment of the present invention.

FIG. 2 shows an original-reading device according to another embodiment of the present invention. An explanation will be omitted of like components as those in the foregoing embodiment, and the detailed explanation will be provided of only components different from those inthe foregoing embodiment.

FIG. 2, there is shown a contact sensor 2. A rotation hole 20 is provided at an upper portion of the closed outer case of the contact sensor 2. A rotation holding shaft 21, threaded through the hole 20, is extended and mounted on right and left frames (not shown). The contact sensor 2 is swingable on the shaft 21. A white-background-reference plate 22 is fixedly mounted on the threaded holding shaft 21 within the case of the contact sensor 2 so that a white-background-reference surface 22a is situated at a position above the transparent glass corresponding to the optical axis when the contact sensor 2 swings to change its attitude to a white-background-reference reading position. The attitude of the white-background-reference plate 22 relative to the main-body frame is regulated by the threaded holding shaft 21 so as to always stand still irrespective of the swinging contact sensor 2.

As described above, by providing the white-background-reference plate 22 within the contact sensor 2, it is possible to more effectively prevent adherence of dust on the white-background-reference surface 22a.

Figure 3:
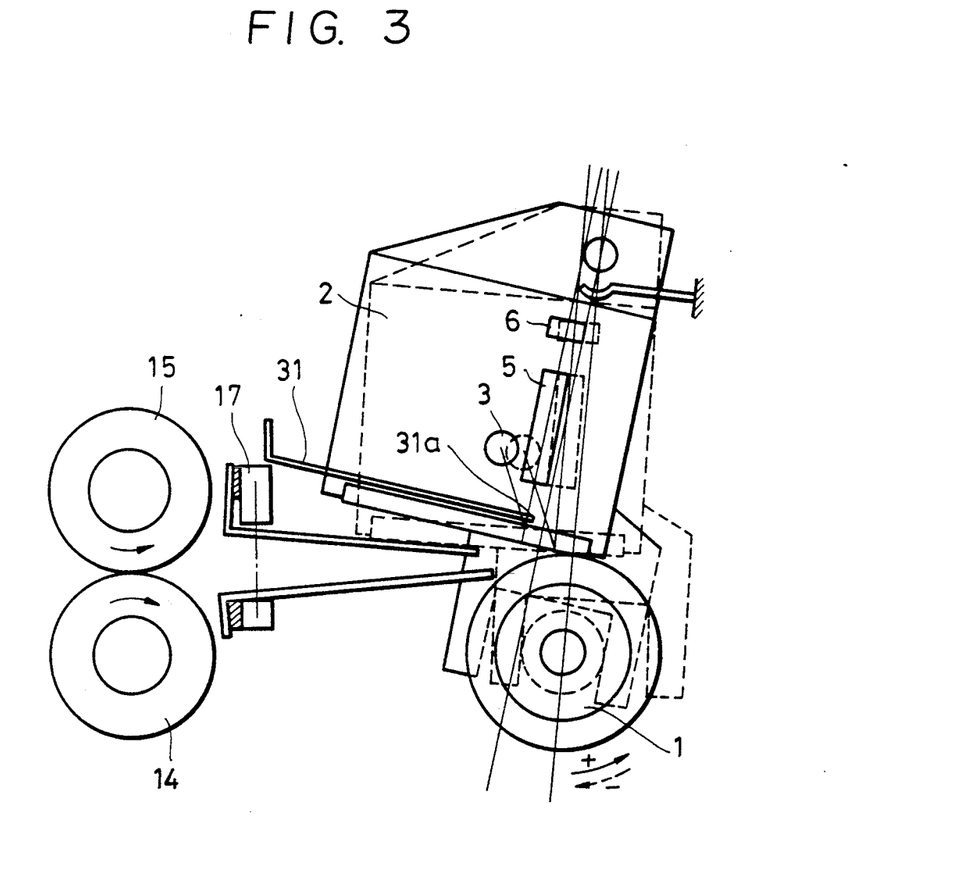
FIG. 3 is a cross-sectional view of an original-reading device according to still another embodiment of the present invention.

FIG. 3 is a cross-sectional view of a reading device according to still another embodiment of the present invention.

As shown in FIG. 3, a standing-still reference plate 31 is fixed on the main-body frame or the upper guiding plate so that a white-background-reference 31a provided within a contact sensor 2 can be read only by the swinging movement of the sensor 2.

The objects, operation and effects of this specific embodiment are identical to those in the first embodiment.

Although an explantion has been provided of the preferred embodiments of the present invention, the present invention is not limited to the above-described embodiments, but various changes and modifications may be made within the true spirit and scope of the present invention.

The individual components shown in outline or designated by blocks in the Drawings are all well-known in the image recording arts and their specific contruction and operation are not critical to the operation or best mode for carrying out the invention While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An original-reading device comprising:
a light source for irradiating an original with light;

a photoelectric conversion device for converting light obtained from the original into an image signal;

a reading unit including said light source and said photoelectric conversion device;

feed means for feeding the original to a reading position, said feed means having an original conveying path;

an image signal-correcting reference member provided at a position different from the reading position, said reference member being disposed above said original conveying path and having a first face facing said path and a second face facing away from said path, said reading unit reading said second face of said reference member; and means for moving said reading unit between a position for reading said reference member and a position for reading the original.

2. An original-reading device according to claim 1, wherein the image signal from the original read by said conversion device is corrected according to a signal from said reference member read by said conversion device.

3. An original-reading device according to claim 2, wherein said conversion device reads the original after reading said reference member.

4. An original-reading device according claim 1, wherein said reading unit includes an imaging lens for imaging the light reflected from the original onto said photoelectric conversion device.

5. An original-reading device according to claim 1, wherein said reference member is disposed in a fixed position with respect to movement of said reading unit.

6. An original-reading device according to claim 5, wherein said reference member is disposed within said reading unit.

7. An original-reading device according to claim 1, further comprising guiding means for guiding the original to the reading position, and wherein said reference member is provided on said guiding means.

8. An original-reading device according to claim 1, wherein said reading unit is situated above said reference member.

9. An original-reading device according to claim 1, wherein said reference member is white.

10. An original-reading device comprising:

a light source for irradiating an original disposed at a reading position;

a photoelectric conversion device for converting light obtained from the original into an image signal;

a reading unit including said light source and said photoelectric conversion device, said reading unit being rotatably movable around a rotation axis;

a reference member provided at a position different from the reading position, for correcting an image signal from the original; and means for rotatably moving said reading unit between a position for reading said reference member and the reading position.

11. An original-reading device according to claim 10, further comprising feed means for feeding the original to the reading position, and wherein said conversion device reads the original being fed by said feed means.

12. An original-reading device according to claim 10, wherein the image signal from the original read by said conversion device is corrected according to a signal from said reference member read by said conversion device.

13. An original-reading device according to claim 12, wherein said conversion device reads the original after reading said reference member.

14. An original-reading device according claim 10, wherein said reading unit includes an imaging lens for imaging the light reflected from the original onto said photoelectric conversion device.

15. An original-reading device according to claim 10, wherein said reference member is disposed in a fixed position with respect to movement of said reading unit.

16. An original-reading device according to claim 15, wherein said reference member is disposed within said reading unit.

17. An original-reading device according to claim 10, further comprising guiding means for guiding the original to the reading position, and wherein said reference member is provided on said guiding means.

18. An original-reading device according to claim 10, wherein said reading unit is situated above said reference member.

19. An original-reading device according to claim 10, wherein said reference member is white.

20. An original-reading device comprising:

a light source for irradiating an original disposed at a reading position;

a photoelectric conversion device for converting light obtained from the original into an image signal;

a reading unit including said light source and said photoelectric conversion device; 'a rotating member facing said reading unit and having an outer circumferential surface contacting said reading unit;

a reference member provided at a position different from the reading position, for correcting an image signal from the original; and means for moving said reading unit between a position for reading said reference member and the reading position in accordance with a rotation of said rotating member.

21. An original-reading device according to claim 20, wherein the image signal from the original read by said conversion device is corrected according to a signal from said reference member read by said conversion device.

22. An original-reading device according to claim 21, wherein said conversion device reads the original after reading said reference member.

23. An original-reading device according to claim 20, wherein said rotating member feeds the orginal between said rotating member and said reading unit, and wherein said reading unit reads the orginal being fed.

24. An original-reading device according to claim 23, wherein said rotating member is white.

25. An original-reading device according to claim 20, further comprising detection means for detecting the original, and wherein said rotating member rotates so as to situate and reading unit at the reference-reading position when the original has been detected by said detection means.

26. An original-reading device according to claim 20, wherein a contact position between said reading unit and said rotating member is different from the reading position.

27. An original-reading device according to claim 20, wherein a surface of said reading unit contacting said rotating member comprises a glass plate.

28. An original-reading device according to claim 20, further comprising a bearing for supporting said rotating member, and wherein said reading unit includes a regulating member for regulating movement of said reading unit by contacting said bearing.

29. An original-reading device according to claim 20, further comprising a pressing means for pressing said reading unit toward the reading position, and wherein said reading unit presses said rotating member when said pressing member presses said reading unit.

30. An original-reading device according claim 20, wherein said reading unit includes an imaging lens for imaging the light relected from the original onto said photoelectric conversion device.

31. An original-reading device according to claim 20, wherein said reference member is disposed in a fixed position with respect to movement of said reading unit.

32. An original-reading device according to claim 31, wherein said reference member is disposed within said reading unit.

33. An original-reading device according to claim 20, further comprising guiding means for guiding the original to the reading position, and wherein said reference member is provided on said guiding means.

34. An original-reading device according to claim 20, wherein said reading unit is disposed above said reference member.

35. An original-reading device according to claim 20, wherein said reference member is white.

36. An original-reading device according to claim 20, furtherd comprising a rotation shaft, and wherein said reading unit rotatably moves around said rotation shaft.

37. An original-reading device according to claim 20, wherein said reading unit comprises a contact sensor.

38. In a device for reading an image from an original, apparatus for reading a reference member to obtain an image correction reference signal, comprising:
 a reading unit including a photoelectric conversion device for reading the original and the reference member, said reading unit being rotatable about a rotation axis; and
 means for rotatably moving said reading unit between a first position where said conversion device reads the original, and a second position where said conversion device reads the reference member.

39. Apparatus according to claim 38 further comprising a reference member fixed with respect to the movable reading unit.

40. Apparatus according to claim 39 further including a roller for feeding the original to the first position, and wherein said reference member is disposed so as not to contact said roller.

* * * * *

UNITED STATES PATENT AND TRADEMARK OFFICE
CERTIFICATE OF CORRECTION

PATENT NO. : 5,125,047
DATED : June 23, 1992
INVENTOR(S) : ITO, ET AL.

It is certified that error appears in the above-identified patent and that said Letters Patent is hereby corrected as shown below:

COLUMN 1

Line 12, "iluminates" should read --illuminates--.

COLUMN 2

Line 39, "firsst" should read --first--;
    Line 53, "origianl" should read --original--;
    Line 60, "fromthe" should read --from the--
    Line 61, "ofthe" should read --of the--; and
    Line 68, "photeletric" should read --photoelectric--.

COLUMN 3

Line 1, "relfected for" should read --reflected from--;
    Line 4, "unti" should read --unit--;
    Line 14, "readjing" should read --reading--;
    Line 16, "photoelectreic" should read --photoelectric--;
    Line 17, "original" should read --the original--;
    Line 57, "lowre" should read --lower--; and
    Line 67, "range $\beta$" should read --range $\alpha$.

COLUMN 4

Line 10, "circumfernece" should read --circumference--;
    Line 26, "suvace" should read --surface--;

COLUMN 5

Line 24, "coringly," should read --cordingly,--;
    Line 34, "posible" should read --possible; and
    Line 35, "satin" should read --stain--.

UNITED STATES PATENT AND TRADEMARK OFFICE
CERTIFICATE OF CORRECTION

PATENT NO. : 5,125,047

DATED : June 23, 1992

INVENTOR(S) : ITO, ET AL.

It is certified that error appears in the above-identified patent and that said Letters Patent is hereby corrected as shown below:

COLUMN 6

Line 11, "inthe" should read --in the--;
Line 12, "Fig. 2," should read --In Fig. 2,--;
Line 55, "invention" should read --invention.--.

COLUMN 8

Line 33, "a" should begin a new paragraph;
Line 53, "original" should read --original--;
Line 55, "original" should read --original--; and
Line 62, "and" should read --said--.

COLUMN 10

Line 7, "furtherd" should read --further--.

Signed and Sealed this

Twenty-fourth Day of August, 1993

Attest:

BRUCE LEHMAN

Attesting Officer

Commissioner of Patents and Trademarks